United States Patent
Pinkston et al.

(10) Patent No.: US 10,146,208 B2
(45) Date of Patent: *Dec. 4, 2018

(54) SYSTEM AND METHOD FOR AUTOMATED OBJECT MEASUREMENT

(71) Applicant: Plethora Corporation, San Francisco, CA (US)

(72) Inventors: Nicholas J. Pinkston, San Francisco, CA (US); Jonathan Stults, San Francisco, CA (US)

(73) Assignee: Plethora Corporation, San Francisco, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/233,349

(22) Filed: Aug. 10, 2016

(65) Prior Publication Data

US 2016/0370790 A1    Dec. 22, 2016

Related U.S. Application Data (63) Continuation of application No. 14/807,350, filed on Jul. 23, 2015, now Pat. No. 9,441,936.

(60) Provisional application No. 62/030,261, filed on Jul. 29, 2014.

(51) Int. Cl.
| | |
|---|---|
| G05B 19/00 | (2006.01) |
| G05B 19/4097 | (2006.01) |
| G01B 5/008 | (2006.01) |
| G01B 21/00 | (2006.01) |
| G05B 19/418 | (2006.01) |

(52) U.S. Cl.
CPC ......... *G05B 19/4097* (2013.01); *G01B 5/008* (2013.01); *G01B 21/00* (2013.01); *G05B 19/41875* (2013.01); *G05B 2219/35218* (2013.01); *G05B 2219/37205* (2013.01); *G05B 2219/49123* (2013.01); *Y02P 90/265* (2015.11)

(58) Field of Classification Search
CPC ........................ G05B 19/41875; G01B 21/00
See application file for complete search history.

(56) References Cited

U.S. PATENT DOCUMENTS

| | | | | |
|---|---|---|---|---|
| 4,442,494 A | * | 4/1984 | Fromson | G01N 3/58 340/680 |
| 4,484,118 A | | 11/1984 | Manabe et al. | |
| 4,901,253 A | | 2/1990 | Iwano et al. | |

(Continued)

OTHER PUBLICATIONS

B.R. Mehta and Y. Jaganmohan Reddy, Industrial Process Automation Systems, Butterworth-Heinemann, Nov. 26, 2014.*

(Continued)

*Primary Examiner* — Christopher E. Everett
(74) *Attorney, Agent, or Firm* — Jeffrey Schox (57) ABSTRACT

A method for automated part probing using a physical machine defining a physical working volume, the method including: generating a virtual model based on a virtual part design received from a user account, the virtual model comprising a virtual part model, based on the virtual part design, virtually fixed to a virtual fixture plate arranged within a virtual working volume representative of the physical working volume; generating a probing routine based on the virtual model; sending the probing routine to the machine; receiving probe outputs from the machine; and validating the virtual model based on the probe outputs.

19 Claims, 3 Drawing Sheets

(56) References Cited

U.S. PATENT DOCUMENTS

| | | | |
|---|---|---|---|
| 4,974,165 A | 11/1990 | Locke et al. | |
| 5,243,665 A | 9/1993 | Maney et al. | |
| 5,251,144 A * | 10/1993 | Ramamurthi | G05B 19/4065 700/177 |
| 5,552,995 A | 9/1996 | Sebastian | |
| 5,726,917 A | 3/1998 | Staaden | |
| 5,778,551 A * | 7/1998 | Herklotz | G01B 7/012 33/503 |
| 5,796,619 A | 8/1998 | Wampler | |
| 5,822,206 A | 10/1998 | Sebastian et al. | |
| 5,910,894 A | 6/1999 | Pryor | |
| 6,012,022 A | 1/2000 | Michiwaki | |
| 6,295,513 B1 | 9/2001 | Thackston | |
| 6,625,616 B1 | 9/2003 | Dragon et al. | |
| 6,675,055 B1 | 1/2004 | Fischer | |
| 6,701,200 B1 | 3/2004 | Lukis et al. | |
| 6,836,699 B2 | 12/2004 | Lukis et al. | |
| 6,928,396 B2 | 8/2005 | Thackston | |
| 7,027,889 B2 | 4/2006 | Nakamura | |
| 7,089,082 B1 | 8/2006 | Lukis et al. | |
| 7,123,986 B2 | 10/2006 | Lukis et al. | |
| 7,146,291 B2 | 12/2006 | Hough | |
| 7,216,011 B2 | 5/2007 | Brisebois | |
| 7,299,101 B2 | 11/2007 | Lukis et al. | |
| 7,496,528 B2 | 2/2009 | Lukis et al. | |
| 7,590,466 B2 | 9/2009 | Lukis et al. | |
| 7,603,191 B2 | 10/2009 | Gross | |
| 7,840,443 B2 | 11/2010 | Lukis et al. | |
| 8,014,889 B2 | 9/2011 | Zinniel et al. | |
| 8,140,401 B2 | 3/2012 | Lukis et al. | |
| 8,239,284 B2 | 8/2012 | Lukis et al. | |
| 8,295,971 B2 | 10/2012 | Krantz | |
| 8,538,574 B2 | 9/2013 | Hahn | |
| 8,581,855 B2 | 11/2013 | Spink et al. | |
| 8,695,958 B2 | 4/2014 | Marrinan | |
| 8,745,517 B2 | 6/2014 | Hartloff | |
| 2003/0125901 A1 | 7/2003 | Steffey et al. | |
| 2003/0126038 A1 | 7/2003 | Lukis et al. | |
| 2004/0250236 A1 | 12/2004 | Amadon et al. | |
| 2004/0254762 A1 * | 12/2004 | Hopkins | C23C 16/52 702/182 |
| 2005/0096780 A1 | 5/2005 | Lukis et al. | |
| 2005/0120010 A1 | 6/2005 | Philpott et al. | |
| 2005/0125092 A1 | 6/2005 | Lukis et al. | |
| 2005/0281453 A1 | 12/2005 | Boyer | |
| 2006/0058909 A1 | 3/2006 | Jesse | |
| 2006/0200270 A1 | 9/2006 | Lukis et al. | |
| 2006/0212160 A1 | 9/2006 | Brisebois | |
| 2007/0038531 A1 | 2/2007 | Lukis et al. | |
| 2007/0042327 A1 | 2/2007 | Swift | |
| 2007/0067059 A1 * | 3/2007 | Travez | B23Q 15/12 700/160 |
| 2007/0173963 A1 | 7/2007 | Bjornson et al. | |
| 2007/0206030 A1 | 9/2007 | Lukis | |
| 2007/0208452 A1 | 9/2007 | Lukis et al. | |
| 2008/0015947 A1 | 1/2008 | Swift | |
| 2008/0269942 A1 | 10/2008 | Free | |
| 2009/0125418 A1 | 5/2009 | Lukis et al. | |
| 2009/0198505 A1 | 8/2009 | Gipps et al. | |
| 2010/0023150 A1 | 1/2010 | Cai et al. | |
| 2010/0087940 A1 * | 4/2010 | Sims, Jr. | G06F 17/50 700/98 |
| 2010/0185312 A1 | 7/2010 | Wang et al. | |
| 2010/0225666 A1 | 9/2010 | Beauchemin | |
| 2010/0332196 A1 | 12/2010 | Fisker et al. | |
| 2011/0047140 A1 | 2/2011 | Free | |
| 2011/0054655 A1 | 3/2011 | Krantz | |
| 2011/0060439 A1 | 3/2011 | Lukis et al. | |
| 2011/0093106 A1 | 4/2011 | Sinha et al. | |
| 2011/0276303 A1 | 11/2011 | Marshall et al. | |
| 2011/0307225 A1 | 12/2011 | Sims et al. | |
| 2012/0078591 A1 | 3/2012 | Sims | |
| 2012/0078592 A1 | 3/2012 | Sims | |
| 2012/0140041 A1 | 6/2012 | Burgunder et al. | |
| 2012/0249820 A1 | 10/2012 | Beauchemin | |
| 2012/0271443 A1 | 10/2012 | Sinha et al. | |
| 2012/0316667 A1 | 12/2012 | Hartloff | |
| 2013/0018525 A1 * | 1/2013 | Jang | G01N 29/225 701/2 |
| 2013/0226648 A1 * | 8/2013 | Horch | G06Q 10/06 705/7.22 |
| 2014/0163720 A1 | 6/2014 | Nelaturi et al. | |
| 2015/0012171 A1 * | 1/2015 | Richter | B64F 5/0045 701/32.9 |

OTHER PUBLICATIONS

"Manufacturing; Study Data from S. Mouton et al Provide new Insights into Manufacturing" (Defense & Aerospace Business, Jul. 6, 2011, p. 218) (hereinafter "Manufacturing").

Hui-Fen Wang, You-Liang Zhang, CAD/CAM integrated system in collaborative environment, Robotics and Computer-Integrated Manufacturing, vol. 18, Issue 2, Apr. 2002, pp. 135-145.

Tek-Jin Nam, David Wright, The development and evaluation of Syco3D: a real-time collaborative 3D CAD system, Design Studies, vol. 22, Issue 6, Nov. 2001, pp. 557-582.

* cited by examiner

SYSTEM AND METHOD FOR AUTOMATED OBJECT MEASUREMENT

CROSS-REFERENCE TO RELATED APPLICATIONS

This application is a continuation of U.S. patent application Ser. No. 14/807,350, filed 23 Jul. 2015, which claims the benefit of U.S. Provisional Application No. 62/030,261 filed 29 Jul. 2014, which is incorporated in its entirety by this reference.

This application is related to U.S. application Ser. No. 14/517,711 filed 17 Oct. 2014 and U.S. application Ser. No. 14/517,734 filed 17 Oct. 2014, which are incorporated in their entireties by this reference.

TECHNICAL FIELD

This invention relates generally to the field of manufacturing, and more specifically to a new and useful method for automated physical assembly validation within a working volume in the field of manufacturing.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
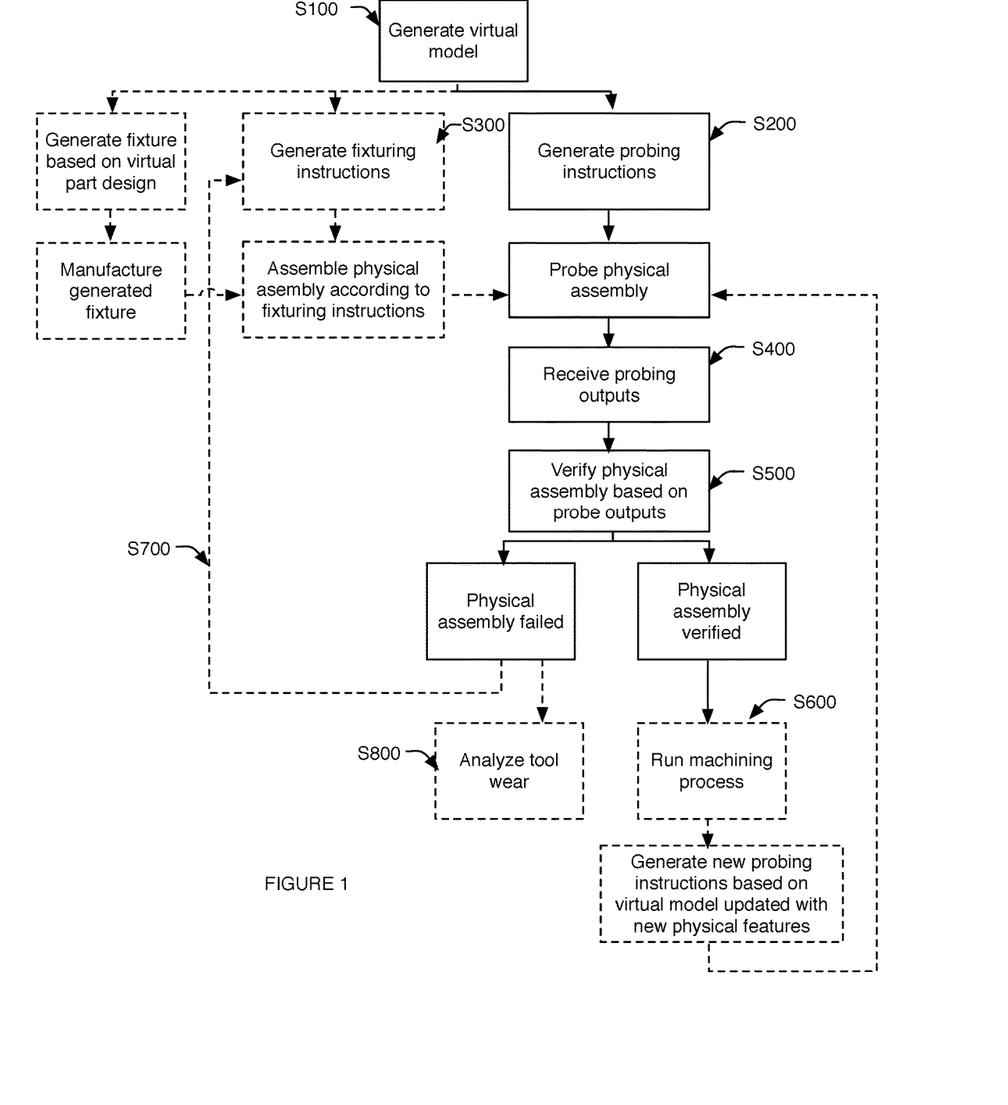
FIG. 1 is a schematic representation of the probing method for a flexible manufacturing process.

As shown in FIG. 1, the method of automated object measurement includes: generating a virtual model of the physical object to be measured; generating a probing routine based on the virtual model; receiving probe outputs based on the probing routine from a probe system; and validating the physical object based on the probe outputs. The method functions to verify that the parameters of a physical object or assembly (real object or assembly) substantially matches those specified by the corresponding virtual model, such that subsequent processes can be performed on the physical object. The method is preferably performed with the system described below, but can alternatively be performed with any other suitable system. This method can be used in rapid prototyping applications (e.g., low-volume, high-mix manufacturing runs), but can alternatively be used for high-volume runs, mid-volume runs, low-mix runs, mid-mix runs, or for any suitable combination and volume of parts. The method can be used in manufacturing parts, fixtures, molds, casts, or any other suitable manufacturing component or product.

In one variation, the method functions to confirm that a physical object is arranged in a physical position specified by the virtual model, such that subsequent position-dependent processes (e.g., machining processes) can be performed on the physical object. In an example of this variation, the method includes: generating a virtual fixture assembly including a virtual part fixed at one of a predetermined set of fixture retention positions on a virtual fixture plate; generating fixture instructions based on the virtual fixture assembly to assemble a physical fixture assembly corresponding to the virtual fixture assembly; generating a probing routine to probe the physical fixture assembly, based on the virtual fixture assembly; and verifying that the physical fixture assembly substantially matches the virtual fixture assembly based on the probe outputs. The method can additionally include: executing a manufacturing process on the physical parts within the physical fixture assembly in response to physical fixture assembly verification; and correcting the physical position of a physical fixture assembly component in response to the physical fixture assembly failing verification.

1. Benefits.

This method can confer several benefits over conventional CMM or on-machine probing systems and methods.

First, by leveraging standardized components and discrete fixture retention positions, which can enable repeatable, high-accuracy and/or high-precision part positioning, the method can enable one set of work coordinates (transfer coordinates) to be used for the concurrent manufacture of a plurality of high-mix parts (e.g., parts with different specified features, possibly requiring different manufacturing processes or paths) on a common fixture plate and a single manufacturing run. This can also enable the same set of work coordinates (transfer coordinates) to be used across multiple fixture plates, parts (on a common or different fixture plate), probing runs, and/or manufacturing runs for a given manufacturing system without intermediary calibration.

Second, by standardizing the components and fixture retention positions, the positions of all components (and associated transfer coordinates, if required) within the working volume is already known. Since all positions are known within a threshold tolerance, this enables the same set of work coordinates (transfer coordinates) to be used across multiple fixture plates, parts (on a common or different fixture plate), probing runs, and/or manufacturing runs for a given manufacturing system, without intermediary calibration. This can also function to expedite virtual model generation, as custom component models do not have to be generated for each physical assembly. This can also function to eliminate or reduce the need for comprehensive on-machine probing prior to manufacturing process execution and/or coordinate measuring machines (CMM).

Third, by standardizing the components and fixture retention positions, some variations of this method enables the physical assemblies (e.g., including the part precursors, fixtures, fixture plates, base plates, and/or working volumes) to be quickly and reliably adjusted to match the virtual model (virtual assembly).

Fourth, by virtualizing the fixturing process, this system decouples the problem of fixturing from the problem of creating toolpaths. Such a system generates both the fixturing strategy and validation that the strategy is correctly (e.g., substantially accurately) implemented in each instance. Because the system and method creates two separate axes of control (fixtures and parts) and controls both these axes, the system and method enables orthogonal variation in both fixtures and parts, which, in turn enables simulation of different runtime configurations to find an optimized (e.g., best possible, lowest cost, fastest, etc.) fixturing setup for a single batch of parts (on one plate) and across a dynamic pool of parts that require fixturing (on multiple plates). The latter, as well as its "just-in-time" nature, can result in delivering the throughput of a homogenous line while still running a dynamic, high-mix, low-run line. However, the method can confer any other suitable benefit over conventional probing methods.

2. System.

Figure 2:
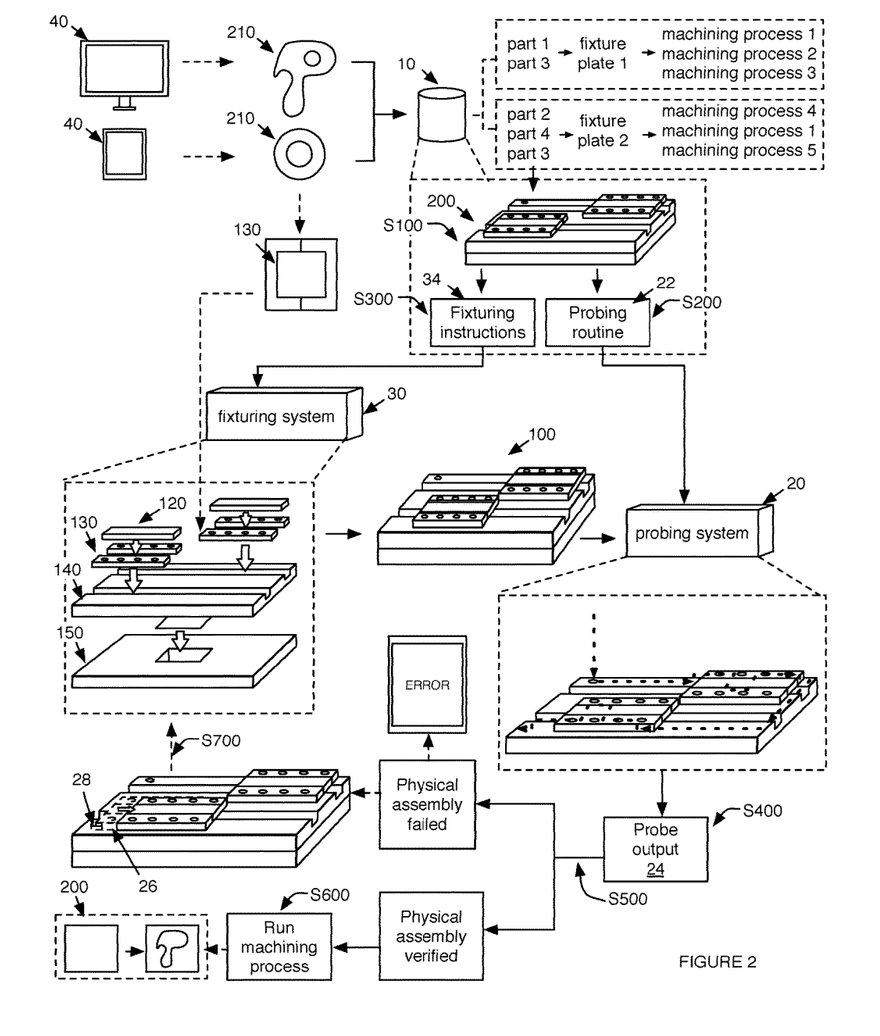
FIG. 2 is a schematic representation of an example of the probing method.

As shown in FIG. 2, this method can be performed with a physical assembly 100, a control system 10, and a probing system 20. The method can be additionally or alternatively performed with a machining system, fixturing system, or any other suitable system or component.

The physical assembly 100 is preferably formed from a set of standardized components (e.g., a constant fixture system with a plurality of standard stock sizes), but can alternatively or additionally be formed from custom or one-off components. The physical assembly 100 can include: a physical part 120, a physical fixture 130, a physical fixture plate 140, a physical base plate 150, a physical working volume, a physical fixture assembly (including a fixture and a part), a physical fixture plate assembly (including a fixture plate and a part, and can additionally include a fixture), a physical base plate assembly (including a fixture plate assembly and a base plate), or include any combination of the above. The standardized components can include: standardized part stock (e.g., standardized stock sizes, materials, etc.), standardized fixtures (e.g., standard fixture bases and/or gripping features), standardized fixture plates, standardized base plates, and/or any other suitable component. Part features and/or manufacturing processes can additionally be standardized, such that users can only add features or apply processes specified by the system to the part stock. Alternatively, the system can permit any part feature or manufacturing process to be applied to the part stock. The standardized components can additionally include a set of standardized, discrete fixture retention positions (e.g., mounting positions), but can alternatively include substantially continuous fixture retention positions or any other suitable set of fixture retention positions.

Figure 3:
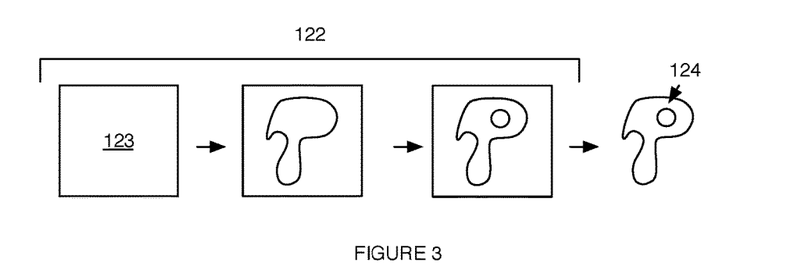
FIG. 3 are schematic representations of an example part as a part precursor in a first, second, and third stage of manufacturing, and of the part as a finished part in the fourth stage of manufacturing.

The physical part 120 can be a part in any stage of the manufacturing process, including part precursors 122 and the finished part 124 (example shown in FIG. 3). Finished parts can be parts that have features substantially matching a virtual part design (e.g., within a threshold tolerance) and/or have no more associated manufacturing processes. Part precursors can be the part in any stage before the part is finalized, and can include raw part stock or machined part stock. Each physical assembly can include one or more physical parts, associated with one or more virtual parts (or virtual part designs) and/or associated with one or more user accounts.

Raw part stock 123 functions as the base material for part manufacture, and is preferably provided in standard (e.g., predetermined) sizes. The set of standardized part stock sizes is preferably finite, wherein the difference between successive part sizes are preferably larger than the part stock tolerance (e.g., permitted variation between part stocks of the same category or size). In use, the smallest part stock from which a given part can be manufactured is preferably selected for the part (e.g., automatically selected by the system based on a corresponding virtual part design, selected by a user, or otherwise selected). However, any other suitable part stock size can be selected for the given part. The part stocks can be symmetric along one or more axes of symmetry (e.g., square, rectangular), asymmetric, or otherwise configured. Alternatively, the part stocks can have customized sizes (e.g., specified by the user, specified by the virtual part design, etc.) or have any other suitable size determined in any other suitable manner. Machined part stock can be part stock to which one or more manufacturing processes have been applied.

Figure 4A:
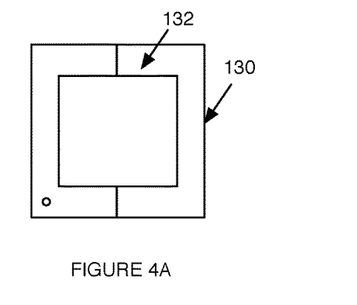
FIGS. 4A and 4B are schematic representations of a first and second example of a fixture for the part precursors and finished part of FIG. 3.
Figure 4B:
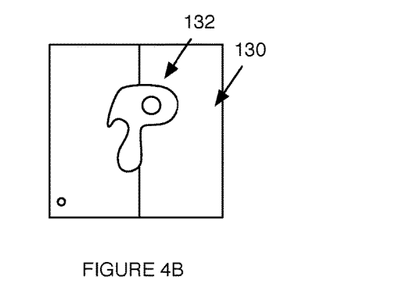

The fixture 130 functions to fix a part 120 to the fixture plate 140. More preferably, a work-holding or support device is used, wherein the work holding device can be a fixture 130, jig, vice, or other device configured to support and/or locate a work piece (e.g., the part). The systems, configurations, and methods described for fixtures below can equally be applied to any other suitable work-holding or support device. The fixture can include a gripping feature, and can additionally include a reference feature and mounting feature (examples shown in FIGS. 4A and 4B for a part in different manufacturing stages). The gripping feature 132 (retention feature) functions to retain a physical part in one or more orientations. The gripping feature can be one of a fixed set of gripping features (e.g., selected from a physical library of gripping features, be a gripping feature corresponding to a virtual gripping feature selected from a virtual library of gripping features, etc.), be a gripping feature including one of a fixed set of parameter values (e.g., include one of a fixed set of shapes, gripping areas, gripping forces, materials, etc.), be a custom gripping feature, or be any other suitable gripping feature. In one variation, a virtual representation of the gripping feature or fixture is generated based on the virtual part design or virtual part, and a physical gripping feature or fixture is machined or otherwise manufactured based on the virtual representation. In another variation, the fixture and/or virtual part design can be received or generated in the manner disclosed in U.S. application Ser. No. 14/517,711, incorporated in its entirety by this reference. However the gripping feature can be any other suitable part retention feature formed in any other suitable manner.

The reference feature functions to permit the probing system to determine a physical position of the fixture, and can allow the control system to estimate the positions of the gripping features and/or any other suitable fixture feature (e.g., by dead reckoning, etc.). The reference feature is preferably arranged at a fixed (static) location on the fixture, but can alternatively be arranged at an adjustable location on the fixture or be associated with the fixture in any other suitable manner. The reference feature is preferably arranged at an asymmetric location on the fixture (e.g., in a corner, proximal a first edge of the fixture, etc.), but can alternatively be arranged at a symmetric location on the fixture or at any other suitable location. The reference feature preferably has a symmetric shape, but can alternatively have an asymmetric shape. The reference feature can be a divot, protrusion, or have any other suitable shape. The reference feature is preferably arranged along the surface of the fixture configured to be proximal the probing system (e.g., the touch probe), but can alternatively be arranged along any other suitable surface of the fixture. The reference feature is preferably located at the same location on each fixture plate of the same type, but can alternatively be located at different locations for each fixture plate. In the latter variation, the system can store the relative location of the reference feature on the fixture plate in association with an identifier for the fixture plate (e.g., a bar code, fixture weight, fixture shape, etc.), or otherwise identify the relative positions between the reference feature and the fixture retention positions on the fixture plate. The position of the reference feature relative to the gripping features (e.g., part retention features) is preferably fixed and known (e.g., virtually replicated in the virtual base plate), but can alternatively be adjustable and known, adjustable and unknown, or otherwise configured. The fixture can include one or more reference features.

The mounting feature functions to mount the fixture to the fixture plate. In one variation, the mounting feature can be a unitary piece with the gripping feature. In a second variation, the mounting feature can be removably coupled to the gripping feature (e.g., by clips, screws, adhesive, etc.). However, the mounting feature can be otherwise related to the gripping feature. The mounting feature is preferably standard (e.g., selected from a physical library, created based on a virtual mounting feature selected from a virtual library, etc.), but can alternatively be custom. However, the fixture can additionally or alternatively include any other suitable component.

The fixture plate 140 function to retain (e.g., mount) one or more parts 120 and/or fixtures 130 to which one or more parts are fixed. The fixture plates can additionally function to mount the parts to the base plate and/or working volume of a machining system. The fixture plates can each include a set of predetermined fixture retention features 142 to which the parts can be fixed, but can alternatively include no predetermined fixture retention features (e.g., be substantially smooth). Each fixture retention feature can concurrently retain one or more fixtures or parts, and can function to enable repeatable fixture or part location on the fixture plate along one or more axes of the fixture plate. The predetermined fixture retention features 142 are preferably located at, and preferably define, a set of predetermined fixture retention positions, but can alternatively define one or more continuous fixture retention positions. The fixture retention positions can be fixed (static) locations on the fixture plate, dynamic (e.g., adjustable) locations on the fixture plate, or be otherwise related to the fixture plate. The set of predetermined fixture retention positions functions to limit the number of positions (e.g., location, orientation, etc.) on the fixture plate to which the parts can be fixed (e.g., to one, two, or any suitable number of positions). Each fixture retention position of the set is preferably physically separate from the remainder of the set, but can alternatively be distinct from the remainder of the set, discrete from the remainder of the set (e.g., wherein each fixture retention position is a discrete fixture retention position), overlap with one or more of the remaining fixture retention positions, or otherwise arranged. The fixture retention features can be located in the same positions on every fixture plate of the same type, but can alternatively be located in different positions on fixture plates of the same type.

Figure 5A:
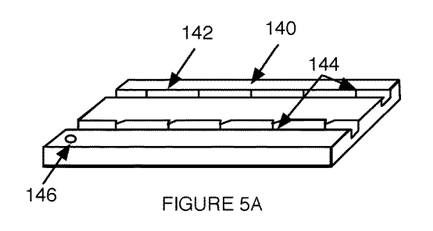
FIGS. 5A, 5B, and 5C are schematic representations of a first and second example of a fixture plate.

In a first variation of the fixture plate, the fixture retention feature can be a discrete, continuous fixture retention feature that functions to limit the number of positions to which a part can be mounted (example shown in FIGS. 2 and 5A). The continuous fixture retention feature can be a recess (e.g., a groove, a T-slot with the headspace arranged distal and the throat arranged proximal the retaining surface), protrusion, or be defined by the fixture plate in any other suitable manner. The feature can be linear, circular, have any other suitable geometry. In one example, the continuous, discrete fixture retention feature can include a linear slot extending along the fixture plate longitudinal axis (e.g., parallel the x-coordinate of the fixture plate), which functions to limit the number of y-coordinate positions to which the part can be mounted.

The continuous fixture retention feature can additionally include a set of stopping features 144, arranged along the fixture retention feature length, which function to define discrete fixture retention positions along the continuous axis of the fixture retention feature (example shown in FIG. 5A). The stopping features preferably engage and retain the fixture (e.g., the mounting feature of the fixture), but can otherwise interact with the fixture or part. The stopping feature can be static, wherein the position of the stopping feature along the fixture retention feature length is preferably known, or can be adjustable. The fixture retention feature preferably includes a finite number of stopping features, but can alternatively include any suitable number of stopping features. In one example, the fixture retention feature can include a linear slot with a plurality of stopping features arranged at predetermined positions along the linear slot, wherein the positions of the stopping features (and distances therebetween) are known and reproduced in the corresponding fixture feature.

In a second variation of the fixture plate, the discrete fixture retention feature is configured to retain a single fixture or part. In this variation, the discrete fixture retention feature can be a cell (example shown in FIG. 5C), a protrusion, a grid or matrix of fixture mounting points (e.g., screw holes, etc., example shown in FIG. 5B), or be any other suitable discrete fixture retention feature. However, the fixture plate can include any other suitable set of fixture retention features.

Figure 5B:
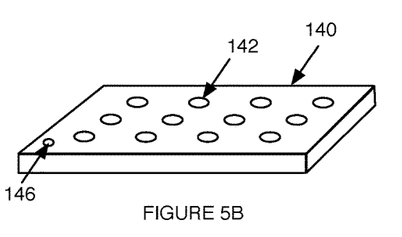
Figure 5C:
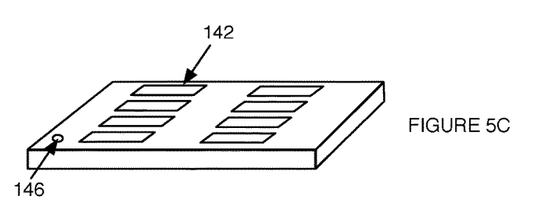

As shown in FIGS. 5A-5C, the fixture plate 140 can additionally include one or more reference features 146. The reference feature functions to permit the probing system to determine a physical position of the fixture plate, and can allow the control system to estimate the positions of the fixture retention positions, cut gripping features, and/or any other suitable fixture plate feature is known (e.g., by dead reckoning, etc.). In one example, the absolute position of the fixture plates are unknown, but the position of the cuts or tool paths, used to create the gripping features, relative to the reference feature, are known. This relative positioning can subsequently be used to automatically perform machining operations on the part precursor (e.g., without probing the part) because the system can determine the position of the part precursor based on the position of the reference feature (e.g., via the gripping feature tool paths). The reference feature is preferably arranged at a fixed (static) location on the fixture plate, but can alternatively be arranged at an adjustable location on the fixture plate or be associated with the fixture plate in any other suitable manner. The reference feature is preferably arranged at an asymmetric location on the fixture plate (e.g., in a corner, proximal a first edge of the fixture plate, etc.), but can alternatively be arranged at a symmetric location on the fixture plate or at any other suitable location. The reference feature preferably has a symmetric shape, but can alternatively have an asymmetric shape. The reference feature can be a divot, protrusion, mounting feature (e.g., through-hole for clips that mount with high repeatability), or have any other suitable shape. The reference feature is preferably arranged along the face of the fixture plate configured to be proximal the probing system (e.g., the touch probe), but can alternatively be arranged along any other suitable surface of the fixture plate.

The reference feature 146 is preferably located at the same location on each fixture plate of the same type, but can alternatively be located at different locations for each fixture plate. In the latter variation, the system can store the relative location of the reference feature on the fixture plate in association with an identifier for the fixture plate (e.g., a bar code, fixture weight, fixture shape, etc.), or otherwise identify the relative positions between the reference feature and the fixture retention positions on the fixture plate. The position of the reference feature relative to the fixture retention features is preferably fixed and known (e.g., virtually replicated in the virtual base plate), but can alternatively be adjustable and known, adjustable and unknown, or otherwise configured. The fixture plate can include one or more reference features. The fixture plate can additionally include mounting features configured to mount the fixture plate to the base plate, or include any other suitable feature.

However, the method can be used with hard jaws, vacuum plates, soft jaws, molds, mold inserts, a combination thereof, or any other suitable fixturing or retention apparatus configured to retain the part precursor, wherein the fixturing apparatus preferably includes the fixture retention features and/or reference features arranged at known locations on the fixturing apparatus.

The base plate 150 functions to receive and retain a physical fixture plate in a predetermined position (the fixture plate position). The base plate can be statically coupled to a machining system, movably mounted to the machining system (wherein the position can be substantially accurately determined by the probing system or otherwise determined), or otherwise coupled to the machining system.

The base plate 150 can include a set of fixture plate retention features, configured to engage and retain the fixture plates. The fixture plate retention features are preferably located at fixture plate positions, and define a finite set of positions to which the fixture plate can be mounted to the base plate. The set of fixture plate retention positions functions to limit the number of positions on the base plate to which the fixture plates can be fixed. The fixture plate retention positions are preferably static and fixed relative to the base plate, but can alternatively move relative to the base plate. The base plate can include one or more fixture plate retention features. The base plate can concurrently retain one or more fixture plates, concurrently retain a single fixture plate, or concurrently retain any suitable number of fixture plates. The fixture plate retention features are preferably discrete (e.g., separate and distinct), but can alternatively overlap, be continuous, or have any other suitable relationship. Examples of fixture plate retention features include sells, grooves, grooves with stopping features, a grid or matrix of mounting holes, or any other suitable fixture plate retention feature.

The base plate 150 can additionally include one or more reference features. The reference feature functions to permit the probing system to determine a physical position of the base plate, and can allow the control system to estimate the positions of the fixture plate retention features and/or any other suitable base plate feature (e.g., by dead reckoning, etc.). The reference feature is preferably arranged at a fixed (static) location on the base plate, but can alternatively be arranged at an adjustable location on the base plate or be associated with the base plate in any other suitable manner. The reference feature is preferably arranged at an asymmetric location on the base plate (e.g., in a corner, proximal a first edge of the base plate, etc.), but can alternatively be arranged at a symmetric location on the base plate or at any other suitable location. The reference feature preferably has a symmetric shape, but can alternatively have an asymmetric shape. The reference feature can be a divot, protrusion, or have any other suitable shape. The reference feature is preferably arranged along the face of the base plate configured to be proximal the probing system (e.g., the touch probe), but can alternatively be arranged along any other suitable surface of the base plate.

The reference feature is preferably located at the same location on each base plate of the same type, but can alternatively be located at different locations for each base plate. In the latter variation, the system can store the relative location of the reference feature on the base plate in association with an identifier for the base plate (e.g., a bar code, fixture weight, fixture shape, etc.), or otherwise identify the relative positions between the reference feature and the fixture retention positions on the base plate. The position of the reference feature relative to the fixture plate retention features is preferably fixed and known (e.g., virtually replicated in the virtual base plate), but can alternatively be adjustable and known, adjustable and unknown, or otherwise configured. The base plate can additionally include mounting features configured to mount the base plate to the machining system, or include any other suitable feature.

The control system 10 functions to execute the method, and can additionally control auxiliary systems, such as the machining system, probing system, and fixturing system. The control system can be a remote system (e.g., remote server system, remote user device, etc.), local computing system, the machining system, the fixturing system, or be any other suitable system. The control system can be connected to the auxiliary systems by a wired or wireless connection, and can send and/or receive information to and/or from the auxiliary system.

The control system 10 can additionally function to define, store, access, or otherwise utilize a virtual model. The virtual model can be representative of a physical assembly to be assembled, but can alternatively be representative of a physical assembly already assembled, or represent the physical assembly in any other suitable state. The virtual representations of the components can be standardized and stored in a library (e.g., when the respective physical component is standardized), dynamically generated, or otherwise determined.

The virtual model 200 can include a virtual part, a virtual fixture, a virtual fixture plate, a virtual base plate, a virtual working volume, a virtual fixture assembly (including a virtual part fixed to a virtual fixture), a virtual fixture plate assembly (including a virtual fixture assembly fixed to a virtual fixture plate), a virtual base plate assembly (including a virtual fixture plate assembly fixed to a virtual base plate), a virtual working volume assembly (including a virtual base plate assembly arranged within a virtual working volume), include a combination of the above, or include a any other suitable virtual component. The virtual components are preferably to-scale virtual replicas of the physical components, but can alternatively be different. The virtual components preferably reflect the mounting and/or retention features of the physical analogs (e.g., the virtual fixture plates have the virtual retention features having the same configuration and arranged in the same relative location as the physical retention features on the physical fixture plates), but can alternatively have different mounting or retention features from the physical analogs. The virtual model is preferably using a library of standardized virtual part models, features, fixtures, fixture plates, base plates, and/or working volumes, but can be otherwise determined. The virtual model can additionally specify the relative positions and/or orientations of each virtual component relative to the other virtual components, the material of each component, the fixturing force of each component, the machining processes to be applied to each part (and/or manufacturing instructions for the respective parts), the past machining processes already performed on each part, or include any other suitable information. Each virtual model preferably represents one step of the manufacturing process of the one or more physical parts, but can alternatively be for multiple steps of the manufacturing process. Different virtual models are preferably generated for each step, but the same virtual model can alternatively be adjusted after each manufacturing step.

The virtual part functions to represent a physical part in virtual space. The virtual part preferably represents the instantaneous form of the physical part, but can alternatively represent a past form or future (e.g., anticipated) form of the physical part. For example, the virtual part can be a to-scale representation of a piece of part stock, or be a to-scale representation of a piece of machined stock, wherein the virtual part can include virtual features in positions corresponding to the respective physical features on the physical part. The virtual part preferably represents the instantaneous stage of the physical part, including virtual representations of the physical part features. The features can be selected from a library, dynamically generated, generated based on the probe output of a previous probing routine, generated using a CMM system, generated based on the tool load output of a previous manufacturing process, or determined in any other suitable manner.

The virtual part is preferably determined (e.g., generated, selected, etc.) based on a virtual part design 210, but can alternatively be determined in any other suitable manner. The virtual part design 210 is preferably received from and associated with a user account (wherein the virtual part can also be associated with the user account), but can alternatively be received from a probing system or be determined in any other suitable manner. In one variation, the virtual part deign can be received from a remote user device 40 associated with the user account. However, the virtual part design can be otherwise received. Examples of the virtual part design include a CAD model, vectorized part model, polygonalized part model, 3D-point model, or include any other suitable virtual representation of a part. The virtual part is preferably associated with a set of machining processes selected to create a physical representation of virtual part design from the physical part precursor, wherein the set of machining processes can be automatically selected (e.g., based on the virtual part design, virtual part, etc.), manually selected, or otherwise determined for the virtual part. Each machining process can specify a type of machining system, a set of machining paths, and/or include any other suitable information. Each virtual model can include one or more virtual parts. When the virtual model includes multiple virtual parts, each virtual part can be associated with the same user account or be associated with different user accounts, and can represent the same virtual part design or different virtual part designs.

The virtual fixture functions to represent a physical fixture in virtual space. The virtual fixture preferably represents the instantaneous form of the physical fixture, but can alternatively represent a past form or future (e.g., anticipated) form of the physical fixture (e.g., prior to fixture manufacture or construction). For example, the virtual fixture can be a to-scale representation of a physical fixture, including virtual representations of the gripping feature and/or mounting feature. The virtual fixture is preferably determined (e.g., generated, selected, etc.) based on a virtual fixture design (e.g., automatically generated or manually selected), but can alternatively be determined in any other suitable manner. The virtual fixture or component thereof can be associated with a virtual part, a user account, a standard fixture number within the system, or be otherwise identified.

The virtual fixture plate functions to represent a physical fixture plate in virtual space. All physical features are preferably virtually reproduced in a corresponding position relative to the virtual fixture plate, but can alternatively be reproduced in another virtual position. For example, the virtual fixture plate can be a to-scale representation of a physical fixture plate, including virtual representations of the physical fixture retention feature(s) and/or mounting feature(s) at virtual positions matching the respective physical positions on the physical fixture plate. In a second example, the physical fixture plate includes a first and second fixture retention position arranged at a first and second fixture retention position, respectively, wherein the first fixture retention position is discrete (e.g., separate and distinct) from the second fixture retention position. The corresponding virtual fixture plate can include a first and second discrete virtual fixture retention feature arranged at a first and second virtual position, respectively, on the virtual fixture plate, wherein the first and second virtual fixture retention positions on the virtual fixture plate correspond to (e.g., mirror) the first and second physical fixture retention positions on the physical fixture plate, respectively. The virtual fixture plate preferably includes the same number of fixture retention features as the analogous physical fixture plate, but can alternatively include more or less fixture retention features. The virtual fixture plate used within the virtual model can be determined (e.g., generated, selected, etc.) based on the number of physical parts to be concurrently processed, the types of fixtures to be concurrently used, the probing, fixturing, and/or machining system to be used, or be determined in any other suitable manner. The virtual fixture plate can be associated with a machining system identifier, a user account, a standard plate number within the system, or be otherwise identified.

The virtual base plate functions to represent a physical base plate in virtual space. All physical features are preferably virtually reproduced in a corresponding position relative to the virtual base plate, but can alternatively be reproduced in another virtual position. For example, the virtual base plate can be a to-scale representation of a physical base plate, including virtual representations of the physical fixture plate retention feature(s) and/or mounting feature(s) at virtual positions matching the respective physical positions on the physical base plate. In a second example, the physical base plate includes a first and second fixture plate retention feature arranged at a first and second fixture plate retention position, respectively, wherein the first fixture retention position is discrete (e.g., separate and distinct) from the second fixture retention position. The corresponding virtual base plate can include a first and second discrete virtual fixture plate retention position arranged at a first and second virtual position, respectively, on the virtual base plate, wherein the first and second virtual fixture plate retention positions on the virtual base plate correspond to (e.g., mirror) the first and second physical fixture plate retention positions on the physical base plate, respectively. The virtual base plate preferably includes the same number of fixture plate retention features as the analogous physical base plate, but can alternatively include more or less fixture retention features. The virtual base plate used within the virtual model can be determined (e.g., generated, selected, etc.) based on the number of physical fixture plates to be concurrently processed, the types of fixture plates to be concurrently used, the probing, fixturing, and/or machining system to be used, or be determined in any other suitable manner. The virtual base plate can be associated with a machining system identifier, a user account, a standard plate number within the system, or be otherwise identified.

The virtual working volume functions to represent a physical working volume of a manufacturing system (e.g., machining system, probing system, etc.) in virtual space. All physical features are preferably virtually reproduced in a corresponding position relative to the virtual working volume, but can alternatively be reproduced in another virtual position. For example, the virtual working volume can include virtual representations of the tool head, sensors, or any other suitable component. The virtual working volume is preferably a to-scale virtual reproduction of the physical working volume of a manufacturing system (e.g., machining system, fixturing system, etc.), but can alternatively be any other suitable representation of the physical working volume.

In one example, the virtual model can include a first and second virtual part model virtually fixed to a virtual fixture plate. The first and second virtual parts can be generated from a first and second virtual part design, respectively, be generated from the same virtual part design, or be otherwise determined. The first and second virtual parts (or associated virtual part designs) can be associated with a first and second user account, respectively, be associated with the same user account, or be associated with any other suitable identifier. The first and second virtual part models are preferably virtually fixed to a first and second virtual discrete fixture retention position on the virtual fixture plate, but can alternatively be virtually fixed to a first and second fixture retention position (e.g., along a continuum) or be otherwise associated with the fixture plate. The first and second virtual parts can be substantially similar or different, and can specify different sizes, shapes, materials, set of manufacturing processes, or any other suitable part parameter. The physical fixture plate assembly assembled based on the virtual model preferably includes a first and second physical part fixed to a first and second physical fixture retention position corresponding to the first and second virtual fixture retention position, respectively, on the corresponding physical fixture plate, but can alternatively be otherwise arranged.

The control system 10 also functions to generate instructions for the auxiliary systems. The instructions are preferably automatically generated based on the virtual model, but can alternatively be received from a user or otherwise determined. The instructions can include probing instructions, fixturing instructions 34, or any other suitable instructions. The probing instructions preferably cooperatively form a probing routine 22, and preferably specify a probing path and/or expected probe outputs, but can alternatively or additionally include any other suitable information. The probing instructions are preferably sent to a probing system or machining system, but can alternatively be used in any other suitable manner. The fixturing instructions 34 preferably specify the parameters for physical assembly, such as which components to use (e.g., which part precursors, fixtures, fixture plates, and/or base plates to use), the relative position of the components (e.g., which fixture retention feature to use, which fixture plate retention feature to use, etc.), fixture forces, mounting mechanisms (e.g., screws, clips, etc.), or specify any other suitable parameter. The fixturing instructions 34 are preferably sent to a fixturing system 30, but can alternatively be used in any other suitable manner.

The probing system 20 functions to execute the probing routine 22. The probing system 20 (e.g., orientation determination mechanism) can additionally function to identify an out-of-specification physical component. The probing system 20 is preferably part of the machining system, but can alternatively be a different system. The probing system 20 can include a touch probe (e.g., analog or digital), a visual system, a scanning system, an optical system (e.g., a laser system), an acoustic system, or any other suitable probing, orientation, or coordinate determination system.

The machining system functions to perform a machining process on the parts. The machining system can additionally function to execute the probing routine. The machining system preferably defines a physical working volume, which can additionally include the physical base plate. The machining system can be an additive machining system, subtractive machining system, or be capable of any other suitable machining process. The machining system can be a vertical machining system, a horizontal machining system, or include any other suitable machining system. The machining system can include: conventional machining systems (e.g., turning, milling), forming systems (e.g., spinning, stamping, punching), cutting systems (e.g., waterjet cutting, wire EDM, laser cutting), additive manufacturing systems (e.g., fused deposition modeling), welding and/or brazing systems, casting systems (e.g., sand casting, investment casting, die casting), injection molding systems, or any other suitable manufacturing or finishing system. Examples of machining systems include CNC, waterjet, milling machine, lathe, molding machine, casting machine, material printing machine (e.g., SLS), or any other suitable machining system.

The fixturing system 30 functions to assemble or facilitate assembly of the physical assembly. For example, the fixturing system 30 can assemble or facilitate assembly of the fixture assembly (e.g., wherein the fixturing system 30 fixes the part to the fixture), fixture plate assembly (e.g., wherein the fixturing system 30 fixes the fixture assembly to the fixture plate), base plate assembly (e.g., wherein the fixturing system 30 fixes the fixture plate assembly to the base plate), or working volume assembly (e.g., wherein the fixturing system 30 arranges the base plate assembly within the working volume). In one variation, the fixturing system is automated. The automatic fixturing system can be a pick-and-place robot or be any other suitable automated fixturing system. In a second variation, the fixturing system can facilitate manual assembly of the physical assembly, and include a workstation with a display configured to render graphical representations of the instructions (e.g., in text, graphics, icons, etc.). However, any other suitable fixturing system can be used.

3. Method.

As shown in FIGS. 1 and 2, generating a virtual model S100 functions to create a virtual reference for the physical analogs. The virtual model can be used for: specifying where the physical analogs of the virtual components should be arranged; verifying that the physical analogs of the virtual components are arranged in the corresponding physical location; quality control of the near-final part; process analysis (e.g., analysis for physical interferences during probing, machining, fixturing, or any other suitable process); component analysis (e.g., component stress due to manufacturing or fixturing forces, inter-component interference or effects, etc.); or be used for any other suitable purpose. The virtual model is preferably generated by the control system, but can alternatively be determined by any other suitable computing system.

The virtual model can be generated at a predetermined frequency; after a threshold number of virtual part designs have been received; after virtual part designs have been received from a threshold number of users (e.g., one or more); at an optimal time, wherein the optimal time can be determined based on an optimization (e.g., cost minimization) analysis, accounting for at least timing for each of the parts and required manufacturing processes; or be generated at any other suitable time.

Generating the virtual model S100 can include: determining the virtual components to use (e.g., based on the optimization analysis, based on the virtual part design, as shown in FIG. 2, etc.); and virtually arranging the first component in a predetermined virtual position relative to a second virtual component. For example, generating the virtual model can include virtually arranging (orienting) the virtual part at the virtual fixture retention position on the virtual fixture plate, virtually arranging the virtual fixture plate at the virtual fixture plate retention position on the virtual base plate, and/or virtually arranging the virtual base plate within the virtual working volume.

Generating a probing routine S200 functions to generate a set of probing instructions for the probing system to probe the physical assembly. The probing routine can be used to generate probe outputs, which can be used to determine whether the parameters of the physical components match the respective virtual models. The probing instructions can specify probe paths or vectors, forces, methods, or any other suitable probing parameter. The probing instructions can additionally specify the probing system when one or more are available. The probing routine and/or probe output can be used to control quality (e.g., validate that the part matches the virtual part design within a margin of error or threshold tolerance); verify that the components are present, are in the correct location, and are in the correct orientation; verify that the component is the correct component (e.g., correct material, correct partially machined part, etc.); verify that a machining process had the desired effect (e.g., created a desired feature) on the physical part precursor; or used in any other suitable manner. The probing routine is preferably generated by the control system, but can alternatively be generated by any other suitable computing system. The probing instructions can be generated after the virtual model has been generated; as the virtual model is being generated; after a machining or other manufacturing process has been completed; or be generated at any other suitable time.

The probing routine is preferably generated based on the virtual model, as shown in FIG. 2, but can be otherwise generated. The probing paths or instructions can be: selected from a library of probe paths, wherein each virtual component or virtual part feature is associated with one or more probe paths in the library and/or each probe path in the library is associated with one or more virtual features or components; calculated based on the features of the virtual model; generated based on user manipulation of the virtual model; or otherwise generated.

The probing routine is preferably additionally or alternatively generated based on a set of predetermined work coordinates. The work coordinates can be used to transform virtual positions in the virtual model into physical positions within the working volume. The work coordinates can additionally or alternatively be used to accommodate for discrepancy between anticipated and actual positions of material within the working volume and/or determine the probing system's physical relationship with a reference point, wherein the reference point can be a point on fixture, point on a fixture plate (e.g., the fixture plate reference feature), point on part (e.g., edge, machined feature, or other reference feature), point on base plate (e.g., reference feature), or be any other suitable reference point on the physical assembly. However, the work coordinates can be otherwise used. The work coordinates can be the coordinates for the machine, the coordinates for the physical assembly within the machine, or be any other suitable set of coordinates. The work coordinates can be determined before, after, or as a part of the probe routine. The work coordinates are preferably determined (e.g., the probing system calibrated) at a predetermined frequency (e.g., every three weeks, every 100 probing routines, etc.), but can alternatively be determined before every probing routine or be determined at any other suitable frequency. The same set of work coordinates are preferably maintained between at least a first and second probing routine, which can be enabled by the highly repeatable relative positioning of the physical components, such that physical components can be accurately and/or precisely positioned within the working volume. However, in some variants, the work coordinates can be modified based on the probe output, to accommodate for differences between the physical assembly and the virtual model, for subsequent position-sensitive processes (e.g., machining processes).

In one example, the probing routine includes: probing a predetermined position within the physical working volume corresponding to the fixture plate reference feature; and probing a physical position within the working volume corresponding to a part feature. Probing a predetermined position within the physical working volume corresponding to the fixture plate reference feature functions to as an initial verification that a physical assembly including the specified fixture plate is arranged within the working volume, and that the specified fixture plate was used. In some variations, this also functions to verify the locations of the physical fixture retention positions within the physical working volume, since the physical fixture retention positions are positioned at known, predetermined, and repeatable locations on the physical fixture plate. Probing a physical position within the working volume corresponding to a part feature functions to determine whether the physical part precursor, work holding piece (e.g., fixture), work holding feature (e.g., fixture lumen), or other manufacturing component is physically located at the specified physical fixture retention position. Probing the physical position of a part feature can additionally function to determine whether the physical part precursor in the physical assembly is the one specified by the virtual model. For example, this process can determine that the wrong part precursor is located in the correct fixture retention position. Probing a physical position corresponding to a physical feature can include probing one or more physical positions corresponding to one or more physical part features. All or a subset of the part's features can be probed. The probed feature can be an identifying part feature (e.g., only part with the identifying feature currently in the machining system or flow, only part with the identifying feature located in the respective position on the part currently in the machining system or flow, etc.), an identifying combination of part features, a high-tolerance feature (e.g., below a threshold tolerance), or be any other suitable feature. Examples of part features include edges (e.g., one or more boundaries of part stock), corners, faces, and machined features, but any other suitable physical part feature can be probed.

The method can additionally include sending the probing routine to the probing system, example shown in FIG. 2, which functions to provide the probing instructions to the probing system. The probing routine can be sent by the control system, machining system (e.g., wherein the machining system controls the probing system), or by any other suitable system. Alternatively, the probing routine can be sent to the machining system, or to any other suitable endpoint. The probing routine can be sent after the probing routine is generated, as the probing routine is generated, or be sent at any other suitable time.

The method can additionally include executing the probing routine at the probing system, example shown in FIG. 2, which functions to perform the probe routine on the physical components within the working volume. The probing system can be controlled by the machining system, the control system, be controlled independently, or be controlled by any other suitable system. The probing routine is preferably performed in response to determination that the physical fixture plate is arranged within the physical working volume (e.g., based on measurements from a sensor within the working volume, wherein the sensor can be a secondary probing system, a weight sensor, a contact switch, or be any other suitable determination mechanism), but can alternatively be performed in response to receipt of a probe request, or be performed at any other suitable time. The method can additionally include executing a manufacturing routine (e.g., a set of toolpaths) based on component position validation within the working volume by the probing routine.

Generating fixturing instructions S300 functions to generate instructions to create a physical assembly substantially similar to that specified by the virtual model. The fixturing instructions (positioning instructions, assembly instructions, etc.) are preferably generated based on the same virtual model from which the probing routine was generated (example shown in FIG. 2), but can alternatively be generated from a second virtual model based on the first virtual model, generated from a second virtual model independent of the first virtual model, received from a user, or be otherwise determined. The fixturing instructions are preferably generated by the same system that generated the virtual model and/or probing routine, but can alternatively be generated by any other suitable system. The fixturing instructions are preferably generated after the virtual model is generated, but can alternatively be generated as the virtual model is being generated. The fixturing instructions can be generated before, after, or concurrently with probing routine generation, and is preferably generated before probing routine execution, but can alternatively be generated at any other suitable time.

The fixturing instructions can include: instructions to assemble (e.g., fix, mount, etc.) a part to a fixture; instructions to assemble a part and/or fixture assembly to a fixture plate; instructions to assemble a fixture plate and/or fixture plate assembly to a base plate; instructions to assemble a base plate assembly to the working volume; or include any other suitable set of instructions. The fixturing instructions preferably specify the physical components to be used (e.g., part stock size, part stock material, component identifier, etc.) and the retention positions and/or relative positions at which the physical components should be fixed, but can additionally or alternatively specify the orientation of the components (e.g., pitch, yaw, roll), the fixturing forces, mounting mechanisms (e.g., screws, clips, etc.), or specify any other suitable fixturing parameter. The fixturing parameters are preferably specified by the virtual part model, wherein the physical components, retention positions, fixture forces, and/or other parameter values are those specified by the virtual components, retention positions, fixture forces, and/or other parameter values, respectively.

In one example, the fixturing instructions for assembly of a fixture plate assembly include instructions to fix a physical part precursor, corresponding to the virtual part, to a physical fixture retention position, on the physical fixture plate, corresponding to the virtual fixture retention position on the virtual fixture plate (example shown in FIG. 2). In a second example, the fixturing instructions for assembly of a base plate assembly include instructions to fix a physical fixture plate, corresponding to the virtual fixture plate, to the physical fixture plate position, on the physical base plate, corresponding to the virtual fixture plate retention position on the virtual base plate (example shown in FIG. 2). In a third example, the fixturing instructions for assembly of a working volume assembly include instructions to arrange the physical fixture plate within the physical working volume according to the virtual model. In a specific example, the fixturing instructions can include instructions to fix a physical base plate, corresponding to the virtual base plate, to a physical base plate retention position, within the physical working volume, corresponding to the virtual base plate retention position within the virtual working volume. However, any other suitable set of fixturing instructions can be generated.

The method can additionally include sending the fixturing instructions to the fixturing system, example shown in FIG. 2, which functions to instruct the fixturing system to assemble the physical assembly. Alternatively, the fixturing instructions can be sent to the machining system, or to any other suitable endpoint. The fixturing instructions are preferably sent by the system generating the fixturing instructions, but can alternatively be sent by any other suitable system. The fixturing instructions can be sent as the fixturing instructions are generated, after all fixturing instructions for the fixture plate or base plate are generated, or at any other suitable time.

The method can additionally include executing the fixturing instructions at the fixturing system, example shown in FIG. 2, which functions to physically assemble the physical analog of the virtual model. The fixturing system can be controlled to execute the fixturing instructions by the control system, controlled independently, or be otherwise controlled. In a first variation, the fixturing system is a fixturing work station that facilitates manual assembly of the physical assembly (e.g., by an operator). In this variation, the fixturing system can include a display that displays a graphical representation of the fixturing instructions (e.g., text, graphics, icons, etc.). However, the fixturing system can additionally or alternatively include any other suitable component. In a second variation, the fixturing system is automated, such that the physical assembly is automatically assembled. In this variation, the fixturing system can include a pick-and-place robot, or include any other suitable automated assembly system.

In one example, the method can include sending a first set of fixturing instructions for construction of a physical fixture plate assembly to a first fixturing system, and sending a second set of fixturing instructions for construction of a physical base plate assembly to a second fixturing system. The first set of fixturing instructions can specify the part precursors, the fixture plate, and the fixture retention positions at which the part precursors are to be fixed. The second set of fixturing instructions can specify the fixture plate assemblies, the machining system, the fixture plate retention positions (of the base plate) to which the fixture plate assemblies are to be fixed, and/or the orientation of the fixture plate assembly relative to the base plate. The method can additionally include facilitating execution of the first and second fixturing instructions at the first and second fixturing systems, respectively, such that the physical components are physically arranged in the physical positions corresponding to and specified by the virtual positions.

Receiving probe outputs from the probing system S400 functions to receive data indicative of physical component parameters within the physical working volume. The data (probe outputs) can include: raw probe measurements from the probing system (e.g., voltage signals, resistance measurements, current measurements, etc.); processed probe measurements; a set of physical position or probing routine step identifiers identifying deviations between the actual and expected measurements or signals (e.g., wherein the expected probe measurements can additionally be provided to the probing system), or include any other suitable data. The probe outputs are preferably generated by the probing system, but can alternatively be generated by any other suitable system. The probe outputs are preferably received by the system generating the probing routine, but can alternatively be received by any other suitable system. The probe outputs are preferably received in response to probing routine execution by the probing system, and can be received (and subsequently analyzed) in real- or near-real time as the probe output is generated (e.g., wherein the probe outputs are streamed to the receiving system as the probe routine is executed), received (and subsequently analyzed) after the probing routine is fully performed, or be received at any other suitable time.

Verifying that the physical assembly substantially matches the virtual model based on the probe outputs S500 functions to confirm that the physical components are arranged in the physical positions specified by the virtual model. Alternatively, this can function to confirm that the virtual model substantially mirrors the physical assembly configuration. Validating the physical assembly, verifying that the physical assembly substantially matches the virtual model, and/or validating the virtual model can additionally function to confirm that the physical components specified by the virtual model were used, that the fixturing parameters substantially match those specified by the virtual model, or function to confirm any other suitable set of variables. The verification is preferably performed by the system generating the probing routine and/or fixturing instructions, but can alternatively be performed by the probing system or by any other suitable system. The verification can be performed in real- or near-real time (e.g., as the probe outputs are received from the machining system), after the probe routine is completed, or at any other suitable time. In response to verification, the method can include performing subsequent machining processes, finalizing the part (e.g., issuing a certificate that the part substantially matches the virtual part design), or perform any other suitable process. In response to verification failure, the method can include correcting the discrepancy, notifying a user (e.g., displaying an error), determining an amount of tool wear, determining motor misalignment, or performing any other suitable process.

In a first variation, validating the physical assembly includes comparing actual and expected probe output, wherein the physical assembly is validated in response to the actual probe output substantially matching the expected probe output (example shown in FIG. 2).

The actual probe output 24 can be considered to substantially match the expected probe output when the actual probe output is within a tolerance threshold 28 of the expected probe output (e.g., the difference between the actual and expected probe outputs can be less than the tolerance threshold, etc.), but can be considered to substantially match the expected probe output based on any other suitable condition being met. The tolerance threshold can be: predetermined (e.g., 1/10,000th of an inch, set by the system or an administrator, etc.); automatically determined; set by a user account; or otherwise determined. The tolerance threshold can be for a single feature (e.g., on a part or part precursor), for a set of axes (e.g., one or more axes), for a single part (e.g., wherein multiple parts on the same fixture plate can have the same or different tolerance thresholds), for all parts on a fixture plate, for a fixture plate (e.g., wherein multiple fixture plates on the same base plate can have the same or different tolerance thresholds), for all fixture plates on the base plate, be a global tolerance threshold (e.g., used for all probing runs), or be applied to any other suitable set of probing runs. In one example, for a first operation, the probing routine can validate that a piece of part stock has been correctly placed into a vice by checking the part stock absolute coordinates along several axes. Because the stock pieces might be obtained via cutting a single piece of bar stock into several sections, the tolerance when measuring along the axis of cut must take the precision of the cutting device into account. In this example, the tolerance of the part stock in the axis of the cut can be predetermined (e.g., calculated or otherwise determined based on the cutting device), while the other axes can be associated with tolerances provided by the stock manufacturer.

The expected probe output 26 is preferably generated based on the virtual model, and functions to represent the probe output that would be expected from the probing system if the physical assembly matched the virtual model. The expected probe output is preferably generated by the system that generates the probing routine, but can alternatively be generated by any other system. The expected probe output can be generated as the virtual model is generated, as the probing routine is generated, as the fixturing instructions are generated, during probe routine executing, or be generated at any other suitable time. The expected probe output can include a set of probe signal values, a set of comparison outputs (e.g., wherein the probing system can compare the expected probe signals with the actual probe signals), or include any other suitable data.

In one example of the first variation, the method includes confirming that a physical position of each physical part precursor within the physical working volume substantially matches a virtual position of the respective virtual part within the virtual working volume based on the probe output and the expected output. In a second example of the first variation, the method includes confirming that a physical position of the physical fixture plate within the physical working volume substantially matches a virtual position of the virtual fixture plate within the virtual working volume, based on the probe output and the expected output. However, the physical arrangement can be otherwise verified by comparing the actual and expected probe outputs.

In a second variation, verifying the physical assembly using the probe outputs can include determining deviations from the probe path. A probe path deviation can be a deviation from the probe routine beyond a threshold deviation, or be any other suitable deviation. In one example, the probe routine can be treated as the expected probe path, the probe path traversed by the probing system can be treated as the actual probe path, and a probe path deviation can be determined by comparing the actual and expected probe paths. However, the probe path deviation can be determined in any other suitable manner. The physical assembly can be verified when the number or magnitude of the deviations is less than a threshold deviation, and fail verification when the number or magnitude of the deviations exceeds the threshold deviation. However, the physical assembly can be otherwise verified based on the probe path deviations. The probe path deviations can be determined by the probing system, the control system, or by any other suitable system.

In a third variation, verifying the physical assembly using the probe outputs can include synchronizing the probe output with the machine position data to generate a secondary virtual model (e.g., including a cloud of 3D points, a set of vectors, a set of polygons, etc.) that is compared to the original virtual model (e.g., the virtual model from which the probe routine is generated). The physical assembly can be verified when the secondary virtual model substantially matches the original virtual model, and can fail verification when the secondary virtual model differs from the original virtual model beyond a threshold difference. However, the physical arrangement can be verified in any other suitable manner.

The second virtual model can be considered to substantially match the original virtual model when the second virtual model is within a tolerance threshold of the original virtual model, but can be considered to substantially match the original virtual model based on any other suitable condition being met. The tolerance threshold can be: predetermined (e.g., 1/1000th of an inch, set by the system or an administrator, etc.); automatically determined; set by a user account; or otherwise determined. The tolerance threshold can be for a single part (e.g., wherein multiple parts on the same fixture plate can have the same or different tolerance thresholds), for all parts on a fixture plate, for a fixture plate (e.g., wherein multiple fixture plates on the same base plate can have the same or different tolerance thresholds), for all fixture plates on the base plate, be a global tolerance threshold (e.g., used for all probing runs), or be applied to any other suitable set of probing runs.

As shown in FIGS. 1 and 2, the method can additionally include facilitating execution of one or more machining process S600. Machining processes are preferably executed in response to physical assembly validation (e.g., determining that the physical assembly substantially matches the virtual model), but can alternatively be performed in response to the physical assembly failing validation, or be executed in response to any other suitable condition being met. The executed machining process is preferably associated with the respective virtual part (e.g., the next machining process to create a physical replica of the virtual part design), virtual fixture plate, or machining system, but can alternatively be any other suitable machining process. The executed machining process can be the next, unperformed machining process in the set of machining processes, a previously performed machining process, or be any other suitable machining process. The machining process can be executed by the machining system (e.g., wherein the machining instructions are sent to the machining system), a control system connected to the machining system (e.g., remote system, connected system, etc.), or be performed by any other suitable system.

Executing the machining process on the physical part precursor can additionally include updating the virtual part with the effects of the machining process on the physical part. The effects of the machining process on the physical part can be modeled based on the specified machining process, modeled based on the machining system feedback (e.g., tool load feedback), determined using a second probing routine, or otherwise determined. The virtual part used to generate the probe routine and/or fixturing instructions is preferably updated with virtual features corresponding to the physical features, but a new virtual part including the features can alternatively be generated.

The method can additionally include correcting discrepancies between the physical assembly and the virtual model S700. The discrepancies are preferably corrected in response to determination that the physical assembly is invalid (e.g., determining that the physical assembly does not substantially match the virtual model), but can alternatively be performed in response to the physical assembly passing validation, or be executed in response to any other suitable condition being met. The discrepancy can be can be corrected by the fixturing system, machining system (e.g., wherein the machining instructions are sent to the machining system), a control system connected to the machining system (e.g., remote system, connected system, etc.), or be corrected by any other suitable system.

The discrepancy can be due to an incorrect or mispositioned part precursor, fixture, fixture plate, base plate, fixture assembly, fixture plate assembly, base plate assembly; be due to tool wear; be due to component wear (e.g., such that the fixtures to not repeatedly relocate to the same fixture retention positions, etc.), or due to any other suitable discrepancy. In one example, the discrepancy can be due to the wrong part precursor (e.g., wrong part stock) being used. In a second example, the discrepancy can be due to the physical assembly being located several tens of thousandths to the right. In a third example, the discrepancy can be due to tool wear, such that the same or related discrepancy pattern is reflected on the physical parts machined using the tool. However, the method can detect and correct for any other suitable discrepancy.

In a first variation, correcting the discrepancy includes modifying the physical assembly (example shown in FIG. 2). This is preferably used when the incorrect physical components are used, or if the physical components are misaligned, but can be used in response to any other suitable condition being met. Modifying the physical assembly can include generating instructions to physically adjust the physical assembly. The instructions can specify the out-of-specification physical component (e.g., the physical component within the physical assembly that does not match the virtual model) and specify the correct positioning parameters for the physical component. However, the physical arrangement can be otherwise corrected.

Generating adjustment instructions can include identifying the out-of-specification physical component, wherein the adjustment instructions can specify the physical component for adjustment. In one variation, the identified component is preferably the component corresponding to the probe instruction and/or expected probe output from which the actual probe output deviated. In a second variation, the deviant component is identified using a probing system (e.g., the same or a different probing system from that generating the actual probe outputs). In one example, the probing system can be a visual system that records an image of the working volume and identifies a mispositioned physical component based on the image and the virtual model. However, the deviant physical component can be identified in any other suitable manner. The identified component can be a part precursor, a fixture, a fixture plate, a base plate, or be any other suitable component.

Generating adjustment instructions can additionally include identifying a deviant component parameter, which functions to identify component parameters that do not substantially match the parameter specified by the virtual model. Examples of component parameters that can be identified include the component retention position, orientation, part precursor type or identifier, fixture type or identifier, fixture plate type or identifier, fixture force, or any other suitable component parameter. The deviant component parameter can be determined based on the actual probe output; based on probing outputs from a probing system (e.g., a secondary probing system, etc.); or be determined in any other suitable manner.

Generating adjustment instructions can additionally include generating new fixturing instructions (e.g., positioning instructions) to bring the component within specifications, as specified by the virtual model. The fixturing instructions can be sent to a fixturing system (e.g., the same or different fixturing system from that initially assembling the physical assembly), or be sent to any other suitable system, wherein the receiving system preferably executes the new fixturing instructions to physically correct the physical assembly. For example, when a part precursor is out of alignment (e.g., improperly retained within a fixture), the new fixturing instructions can identify the part precursor within the physical assembly (e.g., by shape, by position, etc.), and specify corrective action (e.g., push right edge down; replace deviant component with correct component; remove the deviant component from the assembly, wherein the corresponding virtual component can be removed from the virtual model; etc.). The new fixturing instructions can additionally control the machining system to permit user access to the physical assembly (e.g., by controlling the machining system to slide fixture plate entirely or partially out of the working volume).

In a specific example, correcting the discrepancy includes identifying a mispositioned physical component (e.g., misaligned or misoriented) based on the difference between the probe output and the expected output and generating instructions to position the physical component in a physical position specified by the virtual model. The instructions can identify the physical component (e.g., by location, shape, etc.) and specify corrective action, such as the position to which the physical part precursor should be moved, the direction in which the physical part precursor should be moved, or specify the parameters of any other suitable corrective action. The physical component can be one or more part precursors, fixtures, fixture plates, base plates, or any other suitable physical component. However, deviations in any other suitable part can be identified and corrected.

Modifying the physical assembly to correct the discrepancy can additionally include controlling the machining system to execute a probing routine, which functions to run a probing routine on the corrected physical assembly. The probing routine is preferably executed after the physical assembly is corrected, but can alternatively be executed at any other suitable time. The probing routine is preferably the same as the prior probing routine (e.g., the one from which the discrepancy was determined), but can alternatively be a new probing routine. The new probing routine can be generated based on the virtual model, specified by a user, or be otherwise determined. The predetermined work coordinate used in the prior probing run (e.g., the run from which the deviant component was determined) is preferably maintained and used in the subsequent probing run, but a different set of work coordinates can alternatively be used. In a first variation, the probing routine can be executed from the probing instruction (e.g., probing step) at which the actual measured probe output deviated from the expected probe output. In a second variation, the probing routine can be restarted from the beginning of the probing routine. However any other suitable portion of the probing routine can be executed.

In a second variation, correcting discrepancies between the virtual and physical model includes modifying the virtual model to reflect the physical assembly, which functions to adjust the component parameters of the virtual model to substantially mirror the parameters of the physical assembly. This is preferably used when the incorrect physical components are used, or if the physical components are misaligned, but can be used in response to any other suitable condition being met. In this variation, the virtual components and/or virtual component parameters can be modified to substantially mirror the physical assembly (e.g., within a threshold tolerance, margin of error, etc.). In one example, the method can include determining that a part precursor is misaligned, determining the physical orientation of the misaligned part precursor, identifying the corresponding virtual part, and modifying the virtual part to reflect the misalignment. In a second example, the method can include determining that a part feature is located further right than expected, and modify the corresponding virtual part to move the corresponding virtual part feature to the right (to substantially reflect the physical part). However, the virtual model can be otherwise modified.

The second variation can additionally include controlling the machining system to execute a probing routine, which functions to run a probing routine on the corrected physical assembly. The probing routine is preferably executed after the virtual model is adjusted, but can alternatively be executed at any other suitable time. The probing routine is preferably a second, newly generated probing routine, but can alternatively be the prior probing routine (e.g., the one from which the discrepancy was determined), or be any other suitable probing routine. The new probing routine can be generated based on the updated virtual model, generated based on the unmodified virtual model, generated based on the prior probing routine (e.g., wherein probing instructions for unmodified portions of the virtual model can be reused), specified by a user, or be otherwise determined. The predetermined work coordinate used in the prior probing run (e.g., the run from which the deviant component was determined) is preferably maintained and used in the subsequent probing run, but a different set of work coordinates can alternatively be used. In a first variation, the probing routine can be executed from the probing instruction (e.g., probing step) at which the actual measured probe output deviated from the expected probe output. In a second variation, the probing routine can be restarted from the beginning of the probing routine. However any other suitable portion of the probing routine can be executed.

In a third variation, correcting discrepancies between the virtual and physical model includes changing the working coordinates to accommodate for the discrepancy. This is preferably used when the physical assembly is misaligned (e.g., when the relative positions of the components forming the fixture plate assembly are correct, but the fixture plate assembly position within the working volume is incorrect, etc.), but can be used in response to any other suitable condition being met. In this variation, correcting the discrepancy can include determining the actual position of the physical assembly (e.g., based on the physical position of a predetermined reference feature) and reorienting the working coordinates based on the actual position of the physical assembly. Alternatively, the probing system can be recalibrated. However, the working coordinates can be otherwise modified or newly determined to accommodate for the discrepancy. However, the discrepancy can be otherwise corrected.

As shown in FIG. 1, the method can additionally include determining the sharpness of a tool based on the probe output S800. This functions to identify worn tools (e.g., tools below a sharpness threshold, wherein the sharpness threshold can be automatically determined, user-specified, or otherwise determined), but can alternatively or additionally function to identify improperly seated tools, incorrect tools, or any other suitable tool parameter. The probe output used to determine tool wear is preferably the output from the probing routine run after the machining process (e.g., the probing routine used to verify that the desired features were machined), but can alternatively be any other suitable probe output. However, the sharpness of the tool can be determined using a secondary system (e.g., an imaging system), or be determined in any other suitable manner.

In a first variation, worn tools can be identified when the actual part feature locations and/or dimensions created by the tool (e.g., as determined based on the actual probe output), vary beyond a threshold distance from the expected part feature locations and/or dimensions (e.g., if more or less material than expected was removed from the physical part). For example, worn tools can be identified when the smoothness of the physical machined feature is less than that expected for the part (e.g., based on a stored smoothness for the part, calculated from the part dimensions, etc.). In a second variation, worn tools can be identified based on the stress patterns on the parts (e.g., based on image analysis of the material colors before and after the machining process). In a third variation, worn tools can be identified when repeated patterns of feature error (e.g., unanticipated feature placement, unanticipated feature smoothness, etc.) are identified across multiple parts machined by the same tool in the same run, identified across multiple runs, or identified in any other suitable manner. However, the amount or presence of tool wear can be otherwise determined.

An alternative embodiment preferably implements the above methods in a computer-readable medium storing computer-readable instructions. The instructions are preferably executed by computer-executable components preferably integrated with a flexible rapid manufacturing system. The flexible rapid manufacturing system can include a virtual modeling system configured to generate a virtual model of an assembly for machining, a fixturing system configured to assemble physical components according to the virtual model, and a probing system configured to probe the physical assembly assembled by the fixturing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for automated part manufacture using a physical machine defining a physical working volume, the method comprising:
automatically selecting a first and second virtual part design from a plurality of virtual part designs based on a manufacturing process optimization, each virtual part design received from a different user account;
automatically generating a preliminary virtual model, the preliminary virtual model comprising: a first and second virtual preliminary part precursor based on the first and second virtual part designs, respectively, the first and second virtual part precursors virtually fixed to a virtual fixture plate; the virtual fixture plate arranged within a virtual working volume representative of the physical working volume;
sending a probing routine, generated based on the preliminary virtual model, to the machine;
receiving probe outputs from the machine for a physical assembly associated with the preliminary virtual model, the probe outputs generated based on the probing routine;
validating the preliminary virtual model based on the probe outputs;
controlling the machine to execute a machining procedure on the physical assembly in response to validation of the preliminary virtual model;
automatically generating a reference virtual model based on the preliminary virtual model and the machining procedure;
sending a second probing routine, generated based on the reference virtual model, to the machine;
receiving secondary probe outputs from the machine for a modified physical assembly, the modified physical assembly comprising the physical assembly modified by the machining procedure, the secondary probe outputs generated based on the second probing routine;
validating the reference virtual model based on the secondary probe outputs;
determining a feature parameter of a physical feature of the modified physical assembly, based on the secondary probe outputs; and
updating a virtual feature on the reference virtual model, corresponding to the physical feature, with the feature parameter.

2. A method for automated part manufacture using a physical machine defining a physical working volume, the method comprising:
automatically selecting a first and second virtual part design from a plurality of virtual part designs based on a manufacturing process optimization, each virtual part design received from a different user account;
automatically generating a preliminary virtual model, the preliminary virtual model comprising:
a first and second virtual preliminary part precursor representative of a first and second physical part precursor, respectively, the first and second virtual preliminary part precursor selected based on the first and second virtual part designs, respectively;
a first and second virtual fixture; and
a virtual fixture plate arranged within a virtual working volume representative of the physical working volume, wherein the first and second virtual fixture virtually fix the first and second virtual preliminary part precursors to the virtual fixture plate, respectively;
controlling the machine to execute a machining procedure on a physical assembly, the physical assembly comprising the first and second physical part precursors associated with the first and second virtual part designs, respectively;
automatically generating a reference virtual model, the reference virtual model comprising a virtual representation of a modified physical assembly after execution of the machining procedure, the reference virtual model comprising a first and second virtual part precursor for the first and second virtual part designs, respectively, the first and second virtual part precursors comprising the first and second virtual preliminary part precursors modified by the machining procedure, respectively;

generating a probing routine based on the reference virtual model;

sending the probing routine to the machine;

receiving probe outputs from the machine;

validating the reference virtual model based on the probe outputs; and updating the reference virtual model based on the probe outputs.

3. The method of claim 2, wherein validating the reference virtual model comprises:

determining a difference between the reference virtual model and the modified physical assembly, based on the probe outputs; and automatically ceasing part manufacture in response to the difference exceeding a threshold difference;

wherein the reference virtual model is updated based on the probe outputs in response to the difference falling below the threshold difference.

4. The method of claim 2, wherein updating the reference virtual model based on the probe outputs comprises:

determining a parameter of the modified physical assembly based on the probe outputs; and modifying the reference virtual model to reflect the parameter.

5. The method of claim 4, wherein:

determining the parameter of the physical assembly based on the probe outputs comprises determining a feature parameter of a physical feature based on the probe outputs, wherein the physical feature is formed on the physical assembly though the machining procedure; and modifying the reference virtual model to reflect the parameter comprises modifying a virtual feature on the reference virtual model, corresponding to the physical feature, with the feature parameter.

6. The method of claim 5, herein the feature parameter comprises a physical position of the physical feature, wherein modifying the virtual feature with the feature parameter comprises modifying a virtual position of the virtual feature on the reference virtual model to reflect the physical position of the physical feature.

7. The method of claim 5, wherein the feature parameter comprises physical dimensions of the physical feature, wherein modifying the virtual feature with the feature parameter comprises modifying virtual dimensions of the virtual feature on the reference virtual model to reflect the physical dimensions of the physical feature.

8. The method of claim 2, further comprising:

generating a preliminary probing routine based on the preliminary virtual model;

sending the preliminary probing routine to the machine;

receiving preliminary probe outputs from the machine; and validating the preliminary virtual model based on the preliminary probe outputs;

wherein the machine is controlled to execute the machining procedure in response to validating the preliminary virtual model.

9. The method of claim 2, wherein:

the first and second physical part precursors comprise a first and second standard physical part stock, respectively;

the first and second virtual preliminary part precursors comprise a first and second standard virtual preliminary part precursor representative of the first and second standard physical part stock, respectively;

the first and second virtual fixtures comprise a first and second standard virtual fixture representative of a first and second standard physical fixture, respectively; and the virtual fixture plate comprises a standard virtual fixture plate representative of a standard physical fixture plate.

10. The method of claim 2, further comprising determining tool sharpness based on the probe outputs.

11. The method of claim 10, wherein determining the tool sharpness based on the probe outputs comprises identifying a common feature error across a first and second physical feature of the modified physical assembly based on the probe outputs, wherein the first and second physical features are manufactured by a common tool; and determining a tool sharpness for the common tool based on the common feature error.

12. The method of claim 2, wherein the manufacturing process optimization comprises optimizing the manufacturing process for cost.

13. A method for automated part probing using a physical machine defining a physical working volume:

automatically selecting a first and second virtual part design from a plurality of virtual part designs based on a manufacturing process optimization, each virtual part design received from a different user account;

automatically generating a reference virtual model of a physical assembly, the reference virtual model comprising: a first and second preliminary virtual part precursor virtually fixed by a first and second virtual fixture to a virtual fixture plate within a virtual working volume representative of the physical working volume, wherein the first and second virtual preliminary virtual part precursors are representative of a first and second physical part precursor associated with the first and second virtual part designs, respectively, wherein the physical machine is controlled to execute a machining procedure on the physical assembly;

automatically generating a virtual model, the virtual model comprising a first and second virtual part precursor, the first and second virtual part precursors comprising the first and second virtual preliminary virtual part precursors modified by the machining procedure, wherein the first and second virtual part precursors are associated with the first and second virtual part designs, respectively;

generating probing instructions based on the virtual model;

sending the probing instructions to the machine;

receiving probe outputs from the machine;

validating the virtual model based on the probe outputs; and updating the virtual model based on the probe outputs.

14. The method of claim 13, wherein updating the virtual model based on the probe outputs comprises modifying the virtual model to reflect a discrepancy between the virtual model and a physical analog of the virtual model, the discrepancy determined from the probe outputs.

15. The method of claim 13, further comprising controlling the machine to execute the machining procedure, wherein validating the virtual model based on the probe outputs comprises determining, based on the probe outputs, whether an actual machined feature, manufactured with the machining procedure, substantially matches a corresponding expected virtual feature in the virtual model.

16. The method of claim 15, wherein the machine is controlled to execute the machining procedure before the probe outputs are received from the machine; the method further comprising determining a parameter of the actual machined feature based on the probe outputs, wherein updating the virtual model based on the probe outputs comprises updating the virtual model to reflect the parameter of the actual machined feature.

17. The method of claim 16, wherein updating the virtual model to reflect the parameter of the actual machined features comprises modifying the virtual model to reflect an actual position of a part feature, as determined based on the probe outputs.

18. The method of claim 16, wherein updating the virtual model to reflect the parameter of the actual machined feature comprises modifying the virtual model to reflect an actual smoothness of a part feature, as determined based on the probe outputs.

19. The method of claim 13, wherein the manufacturing process optimization comprises optimizing the manufacturing process for speed.

* * * * *